(12) United States Patent
Sehr et al.

(10) Patent No.: US 8,468,592 B2
(45) Date of Patent: Jun. 18, 2013

(54) NATIVE CODE MODULE SECURITY FOR 64-BIT INSTRUCTION SET ARCHITECTURES

(75) Inventors: David C. Sehr, Cupertino, CA (US); Bennet Sze-bun Yee, Mountain View, CA (US); John Bradley Chen, Los Gatos, CA (US); Victor Khimenko, Moscow (RU)

(73) Assignee: Google Inc., Mountain View, CA (US)

( * ) Notice: Subject to any disclaimer, the term of this patent is extended or adjusted under 35 U.S.C. 154(b) by 614 days.

(21) Appl. No.: 12/621,266

(22) Filed: Nov. 18, 2009

(65) Prior Publication Data

US 2011/0029820 A1 Feb. 3, 2011

Related U.S. Application Data

(60) Provisional application No. 61/230,561, filed on Jul. 31, 2009.

(51) Int. Cl.
*G06F 11/36* (2006.01)

(52) U.S. Cl.
USPC .............................. 726/17; 713/200; 715/700

(58) Field of Classification Search
USPC .......................................... 713/200; 715/700
See application file for complete search history.

(56) References Cited

U.S. PATENT DOCUMENTS

| | | | | |
|---|---|---|---|---|
| 5,974,549 | A * | 10/1999 | Golan | 726/23 |
| 2002/0099952 | A1 * | 7/2002 | Lambert et al. | 713/200 |
| 2009/0187822 | A1 * | 7/2009 | Abreu et al. | 715/700 |
| 2009/0282474 | A1 | 11/2009 | Chen et al. | |
| 2009/0282477 | A1 | 11/2009 | Chen et al. | |
| 2011/0029961 | A1 | 2/2011 | Muth et al. | |

OTHER PUBLICATIONS

M. Abadi, M. Budio, U. Erlingsson, and J. Ligatti. Control-flow integrity: Principles, implementations, and applications. In *Proceedings of the 12th ACM Conference on Computer and Communications Security*, Nov. 2005, 14 pages.

U. Erlingsson, M. Abadi, M. Vrable, M. Budiu, and G. Necula. XFI: Software guards for system address spaces. In *OSDI '06: 7th Symposium on Operating Systems Design and Implementation*, pp. 75-88, Nov. 2006, 14 pages.

S. McCamant and G. Morrisett. Evaluation SFI for a CISC architecture. In *15th USENIX Security Symposium*, Aug. 2006, 16 pages.

B. Yee, D. Sehr, G. Dardyk, J. Chen, R. Muth, T. Ormandy, S. Okasaka, N. Narula, and N. Fullagar. Native Client: A Sandbox for Portable, Untrusted x86 Native Code. In *2009 IEEE Symposium on Security and Privacy*, May 2009, 15 pages.

(Continued)

*Primary Examiner* — Nathan Flynn
*Assistant Examiner* — Phuoc Tran
(74) *Attorney, Agent, or Firm* — Fish & Richardson P.C.

(57) ABSTRACT

Some embodiments provide a system that executes a native code module. During operation, the system obtains the native code module. Next, the system loads the native code module into a secure runtime environment. Finally, the system safely executes the native code module in the secure runtime environment by using a set of software fault isolation (SFI) mechanisms that maintain control flow integrity for the native code module and constrain store instructions in the native code module by bounding a valid memory region of the native code module with one or more guard regions.

25 Claims, 3 Drawing Sheets

OTHER PUBLICATIONS

C. Small and M. I. Seltzer. MiSFIT: Constructing safe extensible systems. *IEEE Concurrency: Parallel, Distributed and Movie Computing*, 6(3), 1998, 8 pages.

R. Wahbe, S. Lucco, T.E. Anderson, and S.L. Graham. Efficient software-based fault isolation. In *Proceedings of the Symposium on Operating System Principles*, 1993, 14 pages.

* cited by examiner

NATIVE CODE MODULE SECURITY FOR 64-BIT INSTRUCTION SET ARCHITECTURES

RELATED APPLICATION

This application hereby claims priority under 35 U.S.C. §119 to U.S. Provisional Application No. 61/230,561, entitled "Native Code Modue Security for 64-Bit Instruction Set Architectures," by David C. Sehr, Bennet Sze-bun, and John Bradley Chen, filed 31 Jul. 2009.

The subject matter of this application is related to the subject matter in a co-pending non-provisional application by J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008.

The subject matter of this application is also related to the subject matter in a co-pending non-provisional application by J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008.

The subject matter of this application is also related to the subject matter in a co-pending non-provisional application by Robert Muth, Karl Schimpf, David C. Sehr, and Cliff L. Biffle and filed on the same day as the instant application, entitled "Native Code Module Security for ARM Instruction Set Architectures," having serial number TO BE ASSIGNED, and filing date TO BE ASSIGNED.

BACKGROUND

1. Field

The present embodiments relate to techniques for safely executing native code modules. More specifically, the present embodiments relate to a method and system for safely executing native code modules within x86 64-bit instruction set architectures.

2. Related Art

Easy access to computers and plentiful network bandwidth have facilitated sharing of information and applications. For instance, a user of a computing device (e.g., personal computer, mobile phone, personal digital assistant, etc.) may easily install and execute an application downloaded from a web site or received from a friend as an email attachment. However, installing and executing such applications on a given computing device typically involves a level of trust that is granted on an all-or-nothing basis by the operating system of the computing device. As a result, some (e.g., native) applications may have full access to the operating system and/or resources of the computing device, while other (e.g., web) applications may have little to no direct access to the operating system and/or resources of the computing device.

Such coarse application of trust may negatively impact the execution of all applications on the computing device. For example, native applications may produce unwanted side effects by modifying files on the computing device and/or engaging in computation or communication outside of the tasks or features requested by the user. On the other hand, web applications may execute one to two orders of magnitude slower than native applications and may provide limited functionality to the user.

Hence, what is needed is a finer-grained application of trust to software executing on computing devices.

SUMMARY

Some embodiments provide a system that executes a native code module. During operation, the system obtains the native code module. Next, the system loads the native code module into a secure runtime environment. Finally, the system safely executes the native code module in the secure runtime environment by using a set of software fault isolation (SFI) mechanisms that maintain control flow integrity for the native code module and constrain store instructions in the native code module by bounding a valid memory region of the native code module with one or more guard regions.

In some embodiments, the secure runtime environment is for an x86 64-bit instruction set architecture.

In some embodiments, the system also validates the native code module using one or more of the SFI mechanisms prior to executing the native code module in the secure runtime environment.

In some embodiments, maintaining control flow integrity for the native code module involves:
 (i) validating direct control flow instructions;
 (ii) reserving a base address register storing a base address of memory containing the native code module; and
 (iii) masking destination addresses associated with indirect control flow instructions using the base address register.

In some embodiments, masking destination addresses associated with indirect control flow instructions involves:
 (i) clearing a set of upper bits and a set of lower bits in each of the destination addresses; and
 (ii) adding each of the destination addresses to the base address stored in the base address register.

In some embodiments, reserving the base address register involves initializing the base address register with the base address and enforcing read-only access to the base address register from the native code module.

In some embodiments, constraining store instructions in the native code module further involves:
 (i) enforcing storage of valid data addresses in a stack pointer and a base pointer; and
 (ii) computing a store address by combining a valid base register with a 32-bit displacement and a scaled index.

In some embodiments, enforcing storage of valid data addresses in the stack pointer and the base pointer involves:
 (i) enabling modification of the base pointer only from a copy of the stack pointer;
 (ii) enabling modification of the stack pointer from a copy of the base pointer without masking; and
 (iii) masking other modifications to the stack pointer to keep a value of the stack pointer within the valid memory region.

In some embodiments, the scaled index is masked prior to computing the store address.

In some embodiments, the valid base register corresponds to the stack pointer, the base pointer, or a base address register.

In some embodiments, the guard regions minimize masking associated with computing the store address.

BRIEF DESCRIPTION OF THE FIGURES

In the figures, like reference numerals refer to the same figure elements.

DETAILED DESCRIPTION

Figure 1:
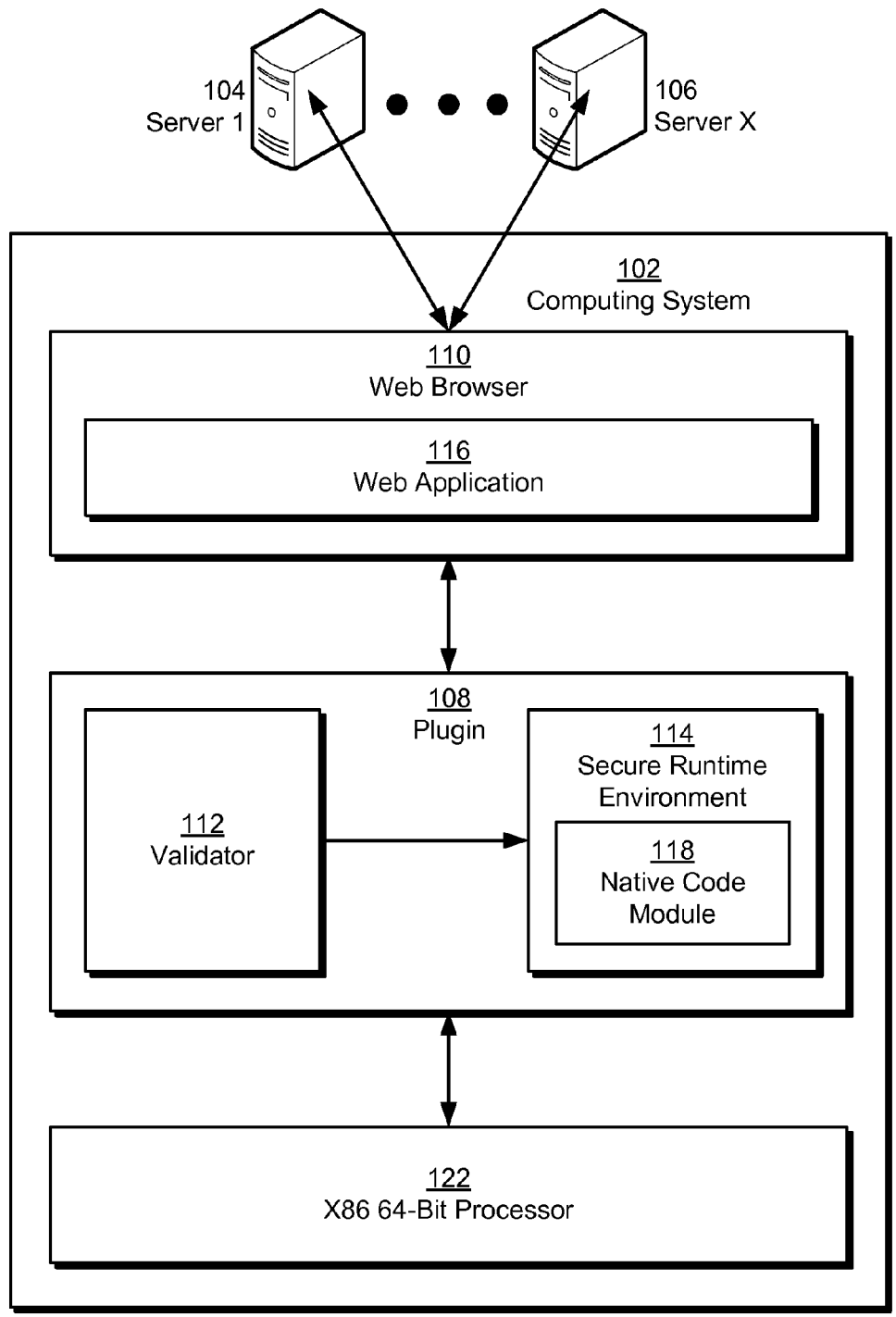
FIG. 1 shows a schematic diagram of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for safely executing a native code module. The native code module may contain native code that is executed within a secure runtime environment that isolates the native code module from sensitive data and resources on the computing system. The native code module may additionally be validated by a validator prior to execution within the secure runtime environment to ensure that the native code module complies with a set of security constraints. Furthermore, the native code module may be used to perform computationally intensive operations for a web application executing within a web browser.

More specifically, embodiments provide a method and system for maintaining security for the native code module within an x86 64-bit instruction set architecture (ISA). To maintain security, the validator and/or secure runtime environment may provide a set of software fault isolation (SFI) mechanisms that maintain control flow integrity and constrain store instructions in the native code module. Control flow integrity may be maintained by validating direct control transfers, reserving a base address register storing a base address of memory associated with the native code module, and/or masking destination addresses associated with control flow instructions using the base address register. Store instructions may be constrained by bounding a valid memory region of the native code module with one or more guard regions, enforcing storage of valid data addresses in a stack pointer and a base pointer, and/or computing store addresses by combining a valid base register with a 32-bit displacement and a scaled index. Consequently, embodiments may provide per-thread protection with low performance overhead during execution of native code modules while maintaining platform independence and portability across different web browsers and operating systems.

FIG. 1 shows a schematic of an exemplary system. This exemplary system includes a computing system 102 and a set of servers (e.g., server 1 104, server x 106). Computing system 102 includes a web application 116 running within a web browser 110, a plugin 108, and an x86 64-bit processor 122. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., x86 64-bit processor 122, memory, I/O components, network interface card, graphics-processing unit (GPU), etc.) on computing system 102 from the operating system, as well as interact with the user through a hardware and/or software framework provided by the operating system, as described below.

In one or more embodiments, computing system 102 includes functionality to obtain and/or execute applications using a network connection. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, hardware, etc.) associated with computing system 102. Though platform independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may obtain and execute a native code module 118 within plugin 108. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application. Furthermore, native code module 118 may be obtained from local storage (e.g., a browser cache) on computing system 102 instead of from a server.

More specifically, native code module 118 may correspond to a software module containing native code that runs directly on hardware provided by computing system 102, such as a CPU (e.g., x86 64-bit processor 122). As a result, native code module 118 may be used to perform tasks that require substantial access to CPU resources on computing system 102. For example, native code module 118 may be used by web application 116 to provide computationally intensive features associated with physics simulation, signal processing, artificial intelligence, modeling, flexible high-throughput cryptography, and/or multimedia editing and analysis.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform independent with respect to the operating system, web browser 110, and/or other software components on computing system 102. As described in the above-referenced applications, plugin 108 and/or native code module 118 may also include mechanisms for executing on a variety of instruction set architectures, including the use of "fat binaries" and binary translators.

However, native code module 118 may not be platform independent with respect to the instruction set architecture (ISA) of one or more processors (e.g., x86 64-bit processor 122) in computing system 102. In particular, different ISAs may implement data types, instructions, registers, addressing modes, memory architecture, interrupt and exception handling, and/or external input/output (I/O) differently. Accordingly, instructions and mechanisms for executing software modules (e.g., web browser 110, native code module 118, plugin 108, etc.) directly on hardware may vary between different ISAs. Moreover, execution of the same software module within multiple ISAs may require that the software module be recompiled into a different binary executable for each ISA. For example, an x86 64-bit implementation of native code module 118 may utilize 64-bit addresses, a flat segmentation model of memory, and 64-bit general-purpose registers (GPRs), while an x86 implementation of native code module 118 may utilize 32-bit addresses, a multi-segment model of memory, and 32-bit GPRs.

Differences in ISA implementations may additionally affect security mechanisms used to validate and execute native code module 118. More specifically, the security mechanisms described in the above-referenced applications for executing native code modules within x86 ISAs may not pertain to mechanisms for safely executing native code modules within x86 64-bit or ARM ISAs. Consequently, the functionality of validator 112 and/or secure runtime environment 114 may require adaptation for use within a variety of ISAs.

In one or more embodiments, the system of FIG. 1 includes functionality to safely execute native code module 118 within an x86 64-bit ISA. In other words, plugin 108 and web browser 110 may correspond to 64-bit software modules that execute directly on x86 64-bit processor 122 using the x86 64-bit ISA. Moreover, native code module 118 may correspond to a set of x86 64-bit instructions and data that is loaded into the address space of x86 64-bit processor 122 and used to facilitate the execution of web application 116.

As with native code modules in x86 environments, the secure execution of native code module 118 on x86 64-bit processor 122 may be facilitated by validator 112 and/or secure runtime environment 114. In particular, validator 112 and secure runtime environment 114 may enable safe execution of native code module 118 on x86 64-bit processor 122 using a set of software fault isolation (SFI) mechanisms in lieu of hardware segmented memory support available in x86 ISAs. Such SFI mechanisms may maintain control flow integrity for native code module 118 and/or constrain store instructions in native code module 118.

Validator 112 and secure runtime environment 114 may also be configured to maintain security for native code modules within ARM ISAs. Native code module security within ARM ISAs is described in co-pending non-provisional application by Robert Muth, Karl Schimpf, and David C. Sehr and filed on the same day as the instant application, entitled "Native Code Module Security for ARM Instruction Set Architectures," having Ser. No. 12/621,286, and filing date Nov. 18, 2009, which is incorporated herein by reference.

In one or more embodiments, native code module 118 is loaded into memory of computing system 102 for inspection by validator 112. Once loaded into memory, page table protection provided by the operating system of computing system 102 may prevent native code module 118 from being modified. Moreover, native code module 118 may be loaded into a valid memory region within the 64-bit address space of computing system 102 that is bounded by one or more guard regions containing unmapped and/or protected pages. As discussed below with respect to FIG. 2, the guard regions may minimize masking associated with certain addressing modes in native code module 118.

In one or more embodiments, validator 112 performs static binary analysis on native code module 118 to ensure that native code module 118 conforms to a set of security constraints. If native code module 118 does not conform to the security constraints, validator 112 may discard native code module 118 prior to loading native code module 118 into secure runtime environment 114.

During analysis of native code module 118, validator 112 may ensure that native code module 118 is statically linked at a start address of zero (e.g., providing a zero-based address range for native code module 118) with the first byte of text at 128 Kbytes after the start address. Validator 112 may then sequentially disassemble and/or decode all executable instructions within native code module 118, beginning with the first byte of text at 128 Kbytes after the start address. During disassembly, validator 112 may verify that no instructions in native code module 118 cross alignment boundaries within the 64-bit address space. In addition, validator 112 may verify that native code module 118 does not contain any "unsafe" or otherwise restricted x86 64-bit instructions, such as instructions that directly invoke the operating system, hardware performance instructions, instructions that are not portable across different operating systems, and/or complex addressing modes.

As described below and in the above-referenced applications, control flow integrity in native code module 118 may be enforced by validating direct control flow instructions and masking destination addresses associated with indirect control flow instructions. To validate direct control flow instructions, validator 112 may statically compute direct control flow targets and confirm that the targets correspond to valid instructions. To validate indirect control flow instructions (e.g., instructions with targets computed at runtime), validator 112 may verify that each indirect control flow instruction is part of a multi-instruction sequence (e.g., pseudo-instruction) with appropriate address masking operations during loading of native code module 118 into memory. As explained below, masking of indirect control flow instructions may involve the use of a reserved base address register.

Once native code module 118 is validated, native code module 118 is executed in secure runtime environment 114. As described in the above-referenced applications, secure runtime environment 114 may load and launch native code module 118 from memory; provide an execution environment that includes communications, threads, memory management, and debugging support for native code module 118; moderate access to system resources according to an access policy for native code module 118; and/or support the isolated execution of multiple native code modules on computing system 102. Consequently, secure runtime environment 114 may provide additional SFI mechanisms for ensuring the secure execution of native code module 118 on computing system 102.

In one or more embodiments, secure runtime environment 114 provides SFI mechanisms that restrict access from native code module 118 to registers, memory, and/or other resources associated with the x86 64-bit ISA. First, secure runtime environment 114 may reference a thread descriptor block associated with native code module 118 using a reserved register on x86 64-bit processor 122, such as one of registers R8-R15. Modifications to the reserved register may only be made by trusted code (e.g., secure runtime environment 114) and not by native code module 118.

Next, secure runtime environment 114 may reserve a base address register for use in masking indirect control flow instructions. The base address register may store the base address of a valid memory region into which native code module 118 is loaded. In one or more embodiments, the base address register corresponds to the R15 register of x86 64-bit processor 122 that is initialized with the base address of an aligned 4 Gbyte region of memory containing native code module 118. Alternatively, the base address register may correspond to a segment-base register such as FS or GS. As a result, the base address register may contain nonzero values in the upper 32 bits and all zeros in the lower 32 bits. Once the base address register is initialized with the base address, secure runtime environment 114 may enforce read-only access to the base address register from native code module 118. The base address register may then be used in indirect control flow pseudo-instructions to ensure that destination addresses (e.g., targets) associated with indirect control flow instructions correspond to valid instructions.

Those skilled in the art will appreciate that the base address of the valid memory region may be stored using a variety of mechanisms. For example, the base address of the valid memory region may be obtained as a global variable (e.g., an absolute memory location) and/or using a system call to secure runtime environment 114. Moreover, the base address may be stored in one or more free registers (e.g., R8-R15) using register allocation techniques applied during compilation of native code module 118. In particular, the base address may be loaded into a register at each entry to a function and used during stores within the function. Native code module 118 and/or validator 112 may further specify the register to be used as the base address register. For example, calling conventions for different functions within native code module 118 may specify different reserved registers for storing the base address of the valid memory region.

In one or more embodiments, destination addresses associated with indirect control flow instructions are masked by clearing a set of upper bits and a set of lower bits in each of the destination addresses, then adding each of the destination addresses to the base address stored in the base address register. For example, an indirect control flow pseudo-instruction that masks a jump instruction with a base address register rbase storing the base address of an aligned 4 Gbyte valid memory region may include the following instructions:

and 0xe0, %eax
    or %rbase, %rax
    jmp*(%rax)

The first instruction of the pseudo-instruction may correspond to a logical-and operation that clears the five lowest bits in the eax register (e.g., using a mask of 0xe0 that is sign-extended to 0xffffffe0) to ensure that the target of the indirect control flow instruction is aligned along a 32-byte alignment boundary and corresponds to a valid instruction (e.g., as confirmed by validator 112 prior to execution). Furthermore, the use of the eax register in the logical-and operation may automatically clear the upper 32 bits of the rax register used in the jump instruction. Next, the second instruction of the pseudo-instruction may correspond to a logical-or operation that adds the upper 32 bits of the rbase register to the zeroed upper 32 bits of the rax register. As a result, the pseudo-instruction may ensure that the target of the jump instruction corresponds to a 32-byte aligned target within the aligned 4 Gbyte valid memory region containing native code module 118.

Those skilled in the art will appreciate that the size and alignment of the valid memory region may allow for a more efficient implementation of SFI than unaligned memory regions and/or memory regions of other sizes. More specifically, the use of the upper 32 bits of the base address register to specify the base address of an aligned 4 Gbyte valid memory region may allow a variety of instructions and operands to be used as modular arithmetic for masking. For example, the indirect control flow pseudo-instruction above may also be implemented using a 32-bit arithmetic instruction that clears the top 32 bits of the rax register (and/or any other general purpose register containing an offset) and an arithmetic add instruction that adds the upper 32 bits of the rbase register to the zeroed upper 32 bits of the rax register.

Such instructions and/or operands may further be selected for use in pseudo-instructions to minimize performance overhead during execution of native code module 118. In particular, the use of legacy 32-bit registers (e.g., the eax register) in x86 64-bit processor 122 and an aligned 4 Gbyte valid memory region may allow for masking of addresses at an overhead of less than one instruction per masking operation. Alternatively, a logical-and operation may be used to mask addresses at an overhead of about one instruction per masking operation if the size of the valid memory region is a power of two that is less than 4 Gbytes. In other words, base-2 modular arithmetic may be used to efficiently implement masking in most 32-bit and 64-bit ISAs, while valid memory regions of arbitrary sizes may preclude the use of base-2 modular arithmetic and require additional overhead in masking operations (e.g., from division operations). However, efficient implementations of non-base-2 arithmetic operations may allow masking operations to use such arithmetic operations. For example, an efficient implementation of base-10 modular arithmetic may allow the size of the valid memory region to be a power of 10 and may introduce the use of base-10 arithmetic operations in masking operations.

Validator 112 and/or secure runtime environment 114 may additionally include SFI mechanisms for constraining load and/or store instructions in native code module 118. Such SFI mechanisms may include the verification of pseudo-instructions and/or specific addressing modes within native code module 118, as well as the use of guard regions to bound the valid memory region of native code module 118. Constraining of store instructions is discussed in further detail below with respect to FIG. 2.

Figure 2:
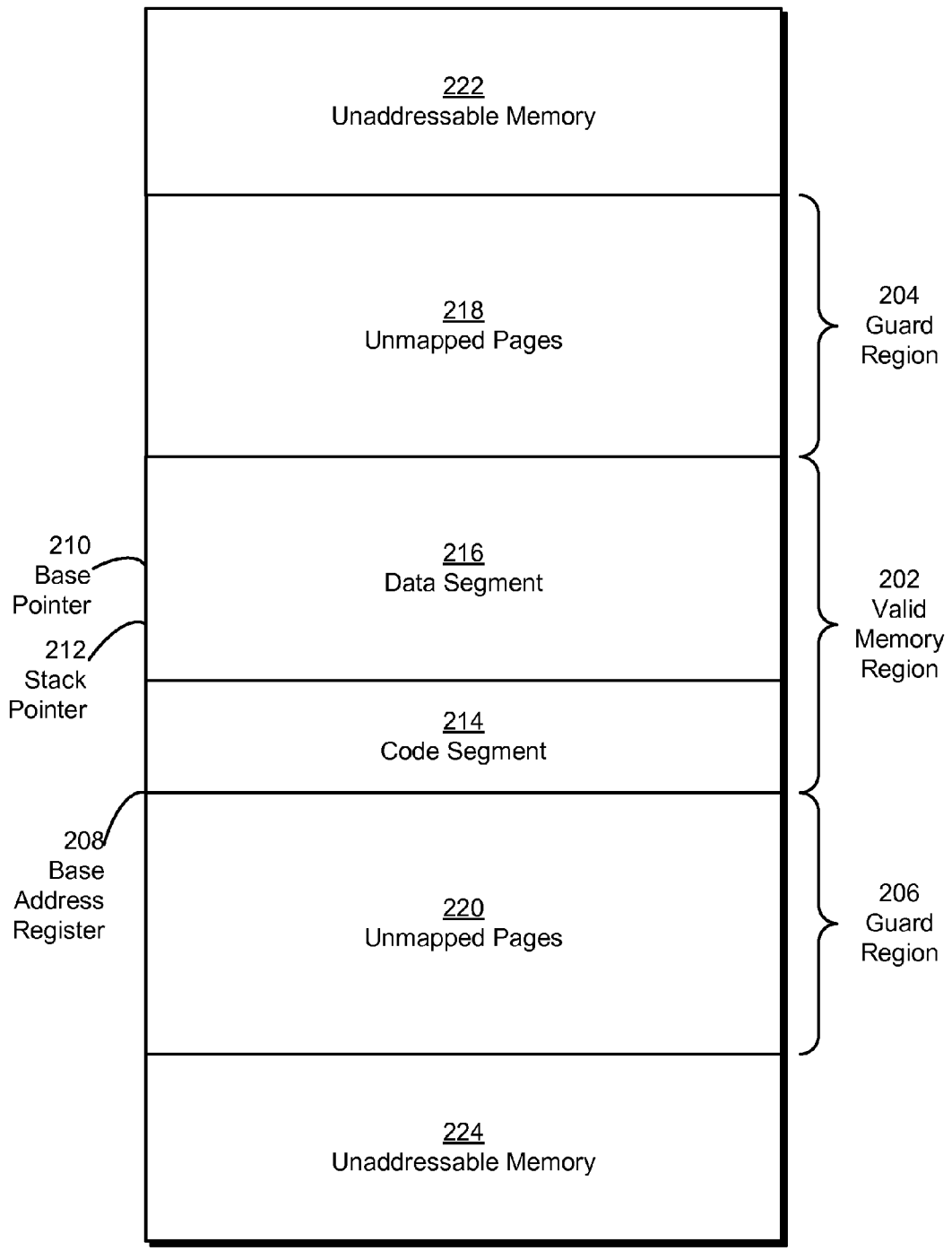
FIG. 2 shows an address space in accordance with an embodiment.

FIG. 2 shows an address space in accordance with an embodiment. The address space may correspond to the address space of an x86 64-bit processor (e.g., x86 64-bit processor 122 of FIG. 1) into which a native code module (e.g., native code module 118 of FIG. 1) is loaded. As shown in FIG. 2, the address space includes a valid memory region 202 containing the native code module, two guard regions 204 and 206 flanking valid memory region 202, and two regions of unaddressable memory 222 and 224. Valid memory region 202 begins at a base address referenced by a reserved base address register 208 (e.g., rbase), while a base pointer 210 and a stack pointer 212 reference two other addresses within valid memory region 202.

In one or more embodiments, a number of SFI mechanisms associated with valid memory region 202, guard regions 204 and 206, base address register 208, base pointer 210, and stack pointer 212 constrain both control flow instructions and stores within the native code module. The SFI mechanisms may be provided by a validator (e.g., validator 112 of FIG. 1) and/or secure runtime environment (e.g., secure runtime environment 114 of FIG. 1) associated with the native code module.

First, the SFI mechanisms may include page table protection in lieu of hardware memory segments provided by x86 ISAs. Page table protection may be provided by the x86 64-bit processor and/or an operating system associated with the address space and may restrict the native code module's access to various parts of the address space. In particular, page table protection may affect access to a code segment 214 and a data segment 216 in valid memory region 202. Code segment 214 may contain code (e.g., instructions) used to execute the native code module, while data segment 216 may contain data used by the native code module. As mentioned previously, code segment 214 may begin at the base address stored in base address register 208, with the first byte of text at 128 Kbytes after the base address. Moreover, after the native code module is loaded into valid memory region 202, page table protection may prevent code segment 214 from subsequent modification.

Page table protection may also prevent the native code module from executing portions of the address space outside of code segment 216. For example, the use of no-execute bits in page table entries may prevent the native code module from executing pages in data segment 216. Bits in page table entries may also be set to restrict portions of data segment 216 to read-only access and/or read-write access by the native code module. For example, string constants associated with the native code module may be stored in a read-only section of data segment 216 that is enforced using page table protection. As discussed below, page table protection associated with unmapped pages 218 and 220 in guard regions 204 and 206 may effectively constrain the native code module's memory references to valid memory region 202 while minimizing performance overhead.

Next, the SFI mechanisms may enforce storage of valid data addresses (e.g., within valid memory region 202) in base pointer 210 (e.g., rBP) and stack pointer 212 (e.g., rSP) used to reference a call stack for executing the native code module. Base pointer 210 and stack pointer 212 may be initialized with offsets from the base address of the native code module's stack segment within valid memory region 202.

To maintain valid data addresses in base pointer 210 and stack pointer 212, the SFI mechanisms may enable modification of base pointer 210 only from a copy of stack pointer 212 and enable unmasked modification of stack pointer 212 from a copy of base pointer 210. Other modifications to stack pointer 212 may be masked to keep the value of stack pointer 212 within valid memory region 202. For example, an update to a 64-bit stack pointer 212 rsp may involve updating esp with a 32-bit value, then performing a logical-or operation that adds the value of base address register 208 (e.g., rbase) to the upper 32 bits of stack pointer 212.

As described above, valid memory region 202 may correspond to an aligned 4 Gbyte region of memory containing code and data for the native code module. Control flow integrity in the native code module may be maintained by using the base address of valid memory region 202 stored in base address register 208 in masking indirect control flow instructions. Moreover, two guard regions 204 and 206 may be created above and below valid memory region 202 to allow store instructions in the native code module to be efficiently constrained. Alternatively, only one guard region may be used if valid memory region 202 begins or ends at a boundary of the address space.

In particular, guard regions 204 and 206 may allow ModR/M addressing modes that calculate store addresses using a base address, a 32-bit displacement, and a scaled 32-bit index to be used by the native code module without additional masking. For example, guard regions 204 and 206 may correspond to 44 Gbyte regions of memory above and below valid memory region 202 that prevent such ModR/M addressing modes from generating store addresses outside of valid memory region 202 and guard regions 204 and 206 (e.g., into unaddressable memory 222 and 224). The sizes of guard regions 204 and 206 may also be adjusted to accommodate other addressing modes in the native code module.

Because such addressing modes may only generate store addresses within valid memory region 202 and/or guard regions 204 and 206, store instructions utilizing the addressing modes may either generate legal memory references into valid memory region 202 or illegal memory references into guard regions 204 and 206. The SFI mechanisms may then respond to illegal memory references by terminating the execution of the native code module and/or triggering traps that handle the illegal memory references.

In one or more embodiments, the base address used in ModR/M addressing is provided by base address register 208, base pointer 210, or stack pointer 212. As a result, the base address may always correspond to a valid address within valid memory region 202. Store instructions that utilize 32-bit displacements with no index register may not require masking, since the resulting store addresses may correspond to displacements of at most 4 Gbytes from the base address. On the other hand, store instructions that include an index provided by a 64-bit register and multiplied by a scale of up to 8 may mask the index by clearing the upper 32 bits of the index. For example, a pseudo-instruction for a store instruction that uses the rcx register as an index may include the following mask:

and 0xffffffff, %ecx

Moreover, store instructions utilizing ModR/M addressing modes may not require any masking if the base address is stored in a segment-base register such as FS or GS. For example, the following store instruction may generate a store address within valid memory region 202 or guard regions 204 and 206:

movl $1, addr32:gs:(%ecx)

Within the example, the GS segment-base register is used as base address register 208, while the addr32 prefix restricts the address computed using the ecx register to 32 bits instead of 64 bits. In other words, the use of a segment-base register as base address register 208 and an addr32 prefix in ModR/M addressing may constrain memory references to valid memory region 202 and guard regions 204 and 206 using a single instruction, which in turn may facilitate the validation of ModR/M memory references within the native code module.

As mentioned above, the size and alignment of valid memory region 202 may affect the efficiency with which the SFI mechanisms for the native code module are implemented. In particular, the use of an aligned 4 Gbyte valid memory region 202 may facilitate the use of simple and/or efficient pseudo-instructions in the SFI mechanisms. However, those skilled in the art will appreciate that the SFI mechanisms may be modified to accommodate unaligned valid memory regions and/or valid memory regions of other sizes. For example, the SFI mechanisms may constrain the native code module to an unaligned valid memory region using arithmetic instructions in masks and/or by extending guard regions 204 and 206 to portions of the address space between the unaligned valid memory region and the next alignment boundaries.

Those skilled in the art will also appreciate that the same SFI mechanisms described above may be used to constrain load instructions in the native code module. In particular, page table protection, guard regions 204 and 206, restrictions on modifications to base pointer 210 and stack pointer 212, masking, and/or ModR/M addressing modes may also be used to constrain load addresses to valid memory region 202.

For example, load addresses may be computed by combining a valid base register (e.g., base address register 208, base pointer 210, stack pointer 212) with a 32-bit displacement and a scaled index. As a result, the validator and/or secure runtime environment may also include functionality to constrain some or all load instructions in the native code module.

Furthermore, the validator and/or secure runtime environment may use a variety of SFI mechanisms to constrain any combination of non-stack-relative loads, non-stack-relative stores, stack-relative loads, and stack-relative stores. Such selective constraining of loads and/or stores may be based on security and/or performance considerations associated with executing the native code module.

Figure 3:
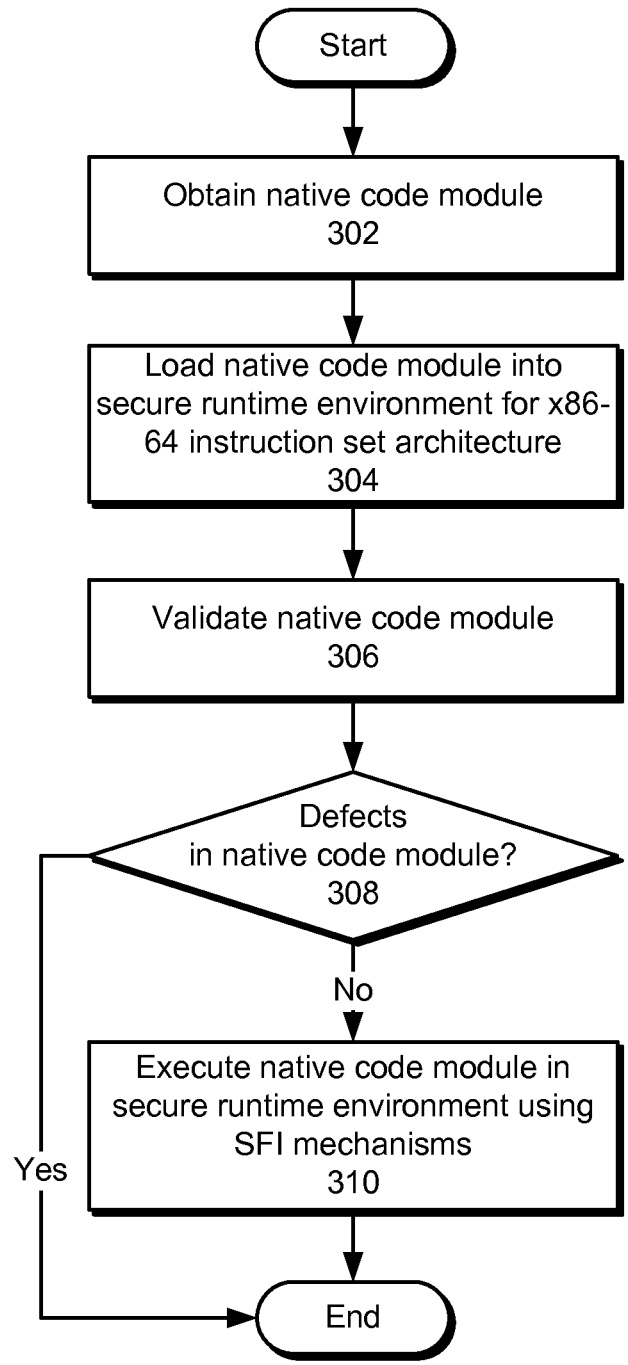
FIG. 3 shows a flowchart illustrating the process of executing a native code module in accordance with an embodiment.

FIG. 3 shows a flowchart illustrating the process of executing a native code module in accordance with an embodiment. In one or more embodiments, one or more of the steps may be omitted, repeated, and/or performed in a different order. Accordingly, the specific arrangement of steps shown in FIG. 3 should not be construed as limiting the scope of the technique.

First, the native code module is obtained (operation 302). The native code module may be obtained from one or more servers and/or compiled from source code. In addition, the native code module may be used to facilitate the execution of a web application, such as a JavaScript application. For example, the native code module may be used to perform computationally intensive operations for the web application.

Next, the native code module is loaded into a secure runtime environment for an x86 64-bit ISA (operation 304). In particular, the native code module may be loaded into a valid memory region in the address space of the x86 64-bit ISA. The loaded native code module is then validated (operation 306) using one or more SFI mechanisms prior to executing the native code module. During validation, the native code module may be inspected for conformity to a set of security constraints. In particular, the native code module may be inspected to detect defects that do not conform to the security constraints (operation 308). If the native code module does not conform to the security constraints (e.g., the validator detects defects in the native code), the native code module is discarded without having been executed.

If the validator does not detect defects in the native code module, the native code module is executed in the secure runtime environment using the SFI mechanisms (operation 310). The secure runtime environment may be provided by a plugin associated with the web browser, a browser extension to the web browser, and/or a component within the web browser. The SFI mechanisms may maintain control flow integrity for the native code module and/or constrain store instructions in the native code module. To maintain control flow integrity, the SFI mechanisms may validate direct control flow instructions, reserve a base address register storing a base address of memory associated with the native code module, and/or mask destination addresses associated with indirect control flow instructions using the base address register. Similarly, the SFI mechanisms may constrain store instructions by bounding an address space of the native code module with one or more guard regions (e.g., guard regions), enforcing storage of valid data addresses in a stack pointer and a base pointer, and/or computing store addresses by combining a valid base register with a 32-bit displacement and a scaled 32-bit index.

Consequently, the SFI mechanisms used to validate and execute the native code module may enable secure execution of the native code module on x86 64-bit hardware with low performance overhead while maintaining portability and platform independence across different web browsers and operating systems. In particular, the SFI mechanisms may provide per-thread protection that constrains threads used to execute untrusted code in the native code module while allowing trusted code used to validate and execute the native code module to execute without constraints. Furthermore, the SFI mechanisms may improve performance by minimizing overhead associated with masking store instructions. Finally, the direct execution of the native code module on x86 64-bit hardware may allow the native code module to execute on a variety of x86 64-bit processors and operating systems without modification.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computer-implemented method for executing a native code module, comprising:
    loading the native code module into a secure runtime environment of a computing system, including loading the native code module in a valid memory region for the native code module; and
    constraining store instructions in the native code module, including bounding the valid memory region for the native code module with one or more guard regions, wherein the one or more guard regions are large enough to prevent a store address of at least one multi-register addressing mode of the store instructions from being outside of the one or more guard regions.

2. The computer-implemented method of claim 1, wherein the secure runtime environment is for an x86 64-bit instruction set architecture, and the computing system includes a processor implementing the x86 64-bit instruction set architecture.

3. The computer-implemented method of claim 1, further comprising:
    validating the native code module prior to executing the native code module in the secure runtime environment, including verifying that each control flow instruction in the native code module has a respective target address that is aligned at a predetermined instruction alignment boundary in the valid memory region.

4. The computer-implemented method of claim 3, wherein verifying that each control flow instruction in the native code module has a respective target address that is aligned at a predetermined instruction alignment boundary in the valid memory region comprises:
    verifying that each indirect control flow instruction in the native code module is part of a multi-instruction sequence with one or more masking operations that constrain the target address to be aligned at the predetermined instruction alignment boundary in the valid memory region.

5. The computer-implemented method of claim 4, further comprising:
    reserving a base address register storing a base address of memory containing the native code module; and
    masking destination addresses associated with indirect control flow instructions, including clearing a set of upper bits and a set of lower bits in each of the destination addresses and adding each of the destination addresses to the base address stored in the base address register.

6. The computer-implemented method of claim 4, wherein reserving the base address register involves:
    initializing the base address register with the base address; and
    determining that all access to the base address register from the native code module is read only.

7. The computer-implemented method of claim 1, wherein constraining the store instructions in the native code module further comprises:
    verifying that modification of a base pointer is only from a copy of a stack pointer;
    verifying that modification of the stack pointer is only from a copy of the base pointer without masking; and
    verifying that other modifications to the stack pointer are masked to keep a value of the stack pointer within the valid memory region.

8. A system for executing a native code module, comprising:
    a processor;
    a computer-readable storage medium including instructions, which when executed by the processor cause the processor to perform a method comprising:
        loading the native code module into a secure runtime environment of the system, including loading the native code module in a valid memory region for the native code module; and
        constraining store instructions in the native code module, including bounding the valid memory region for the native code module with one or more guard regions, wherein the one or more guard regions are large enough to prevent a store address of at least one multi-register addressing mode of the store instructions from being outside of the one or more guard regions.

9. The system of claim 8, wherein the secure runtime environment is for an x86 64-bit instruction set architecture.

10. The system of claim 8, further comprising:
    a validator configured to validate the native code module prior to executing the native code module in the secure runtime environment, including verifying that each control flow instruction in the native code module has a respective target address that is aligned at a predetermined instruction alignment boundary in the valid memory region.

11. The system of claim 10, wherein verifying that each control flow instruction in the native code module has a respective target address that is aligned at a predetermined instruction alignment boundary in the valid memory region comprises:
    verifying that each indirect control flow instruction in the native code module is part of a multi-instruction sequence with one or more masking operations that constrain the target address to be aligned at the predetermined instruction alignment boundary in the valid memory region.

12. The system of claim 11, further comprising:
    reserving a base address register storing a base address of memory containing the native code module; and
    masking destination addresses associated with indirect control flow instructions including clearing a set of upper bits and a set of lower bits in each of the destination addresses and adding each of the destination addresses to the base address stored in the base address register.

13. The system of claim 11, wherein reserving the base address register involves:

initializing the base address register with the base address; and determining that all access to the base address register from the native code module is read only.

14. The system of claim 8, wherein constraining the store instructions in the native code module further comprises:

verifying that modification of a base pointer is only from a copy of a stack pointer;

verifying that modification of the stack pointer is only from a copy of the base pointer without masking; and verifying that other modifications to the stack pointer are masked to keep a value of the stack pointer within the valid memory region.

15. A non-transitory computer-readable storage medium storing instructions that when executed by a computer cause the computer to perform a method for executing a native code module, the method comprising:

loading the native code module into a secure runtime environment of the computer, including loading the native code module in a valid memory region for the native code module; and constraining store instructions in the native code module, including bounding the valid memory region for the native code module with one or more guard regions, wherein the one or more guard regions are large enough to prevent a store address of at least one multi-register addressing mode of the store instructions from being outside of the one or more guard regions.

16. The computer-readable storage medium of claim 15, wherein the secure runtime environment is for an x86 64-bit instruction set architecture.

17. The computer-readable storage medium of claim 15, the method further comprising:

validating the native code module prior to executing the native code module in the secure runtime environment, including verifying that each control flow instruction in the native code module has a respective target address that is aligned at a predetermined instruction alignment boundary in the valid memory region.

18. The computer-readable storage medium of claim 17, wherein verifying that each control flow instruction in the native code module has a respective target address that is aligned at a predetermined instruction alignment boundary in the valid memory region comprises:

verifying that each indirect control flow instruction in the native code module is part of a multi-instruction sequence with one or more masking operations that constrain the target address to be aligned at the predetermined instruction alignment boundary in the valid memory region.

19. The computer-readable storage medium of claim 18, further comprising:

reserving a base address register storing a base address of memory containing the native code module; and masking destination addresses associated with indirect control flow instructions, including clearing a set of upper bits and a set of lower bits in each of the destination addresses and adding each of the destination addresses to the base address stored in the base address register.

20. The computer-readable storage medium of claim 15, wherein constraining the store instructions in the native code module further comprises:

verifying that modification of a base pointer is only from a copy of a stack pointer;

verifying that modification of the stack pointer is only from a copy of the base pointer without masking; and verifying that other modifications to the stack pointer are masked to keep a value of the stack pointer within the valid memory region.

21. The computer-implemented method of claim 1, wherein the guard regions include a first 44 Gbyte region above the valid memory region and a second 44 Gbyte region below the valid memory region.

22. The computer-implemented method of claim 1, wherein the valid memory region is an aligned 4 Gbyte memory region.

23. The computer-implemented method of claim 1, wherein the guard regions include a guard region larger than 44 Gbyte.

24. The computer-implemented method of claim 2, wherein:

the computing system has a 64-bit address space;

the native code module includes a set of x86 64-bit instructions and data; and loading the native code module into the secure runtime environment of the computing system includes loading the native code module in a valid memory region within the 64-bit address space.

25. The computer-implemented method of claim 24, wherein the guard regions include only one guard region and the valid memory region begins or ends at a boundary of the 64-bit address space.

* * * * *

UNITED STATES PATENT AND TRADEMARK OFFICE
CERTIFICATE OF CORRECTION

PATENT NO. : 8,468,592 B2
APPLICATION NO. : 12/621266
DATED : June 18, 2013
INVENTOR(S) : David C. Sehr et al.

Page 1 of 1

It is certified that error appears in the above-identified patent and that said Letters Patent is hereby corrected as shown below:

In the Specification:

Column 1, line 9, delete "Modue" and insert -- Module --, therefor.

In the Claims:

Column 14, line 22, in Claim 8, delete "processor" and insert -- processor, --, therefor.

Signed and Sealed this
Twenty-ninth Day of October, 2013

Teresa Stanek Rea
*Deputy Director of the United States Patent and Trademark Office*